United States Patent [19]

Lynch et al.

[11] Patent Number: 4,520,763
[45] Date of Patent: Jun. 4, 1985

[54] FUEL INJECTION SYSTEM

[75] Inventors: Franklin E. Lynch, Conifer; Nathaniel R. Baker, Denver, both of Colo.

[73] Assignee: Ergenics Inc., Wyckoff, N.J.

[21] Appl. No.: 617,713

[22] Filed: Jun. 6, 1984

Related U.S. Application Data

[63] Continuation of Ser. No. 305,409, Sep. 25, 1981, abandoned.

[51] Int. Cl.$^3$ .............................................. F02D 21/02
[52] U.S. Cl. .................. 123/1 A; 123/DIG. 12; 123/408; 123/447; 123/462; 123/527
[58] Field of Search ............. 123/447, DIG. 12, 1 A, 123/3, 525, 527, 446, 462, 406, 408

[56] References Cited

U.S. PATENT DOCUMENTS

| | | | |
|---|---|---|---|
| 2,937,634 | 5/1960 | Kelseaux et al. | 123/DIG. 12 |
| 3,587,547 | 6/1971 | Hussey | 123/447 |
| 3,662,721 | 5/1972 | Klein | 123/462 |
| 4,015,569 | 4/1977 | Leshner et al. | 123/447 |
| 4,018,190 | 4/1977 | Henault | 123/DIG. 12 |
| 4,103,653 | 8/1978 | Ueno et al. | 123/408 |
| 4,167,920 | 9/1979 | Lepera et al. | 123/DIG. 12 |
| 4,178,882 | 12/1979 | Anderson et al. | 123/DIG. 12 |
| 4,225,320 | 9/1980 | Gell | 123/DIG. 12 |
| 4,378,775 | 4/1983 | Straubel et al. | 123/458 |

Primary Examiner—E. Rollins Cross
Attorney, Agent, or Firm—Charles E. Baxley

[57] ABSTRACT

Discloses a fuel injection system for the timed introduction of a gaseous fuel such as hydrogen gas into a combustion volume of an internal combustion engine. The system comprises (a) a chamber of fixed volume into which, at one time, gas flows from a fuel source and out of which, at another time, gas flows to a combustion volume of an internal combustion engine and (b) means for varying the pressure of the gas flowing to the chamber.

22 Claims, 6 Drawing Figures

FUEL INJECTION SYSTEM

This is a continuation of co-pending application Ser. No. 305,409 filed on Sept. 25, 1981 now abandoned.

The present invention is concerned with gaseous fuel injection into internal combustion engines and in particular with gaseous hydrogen injection into internal combustion engines.

BACKGROUND OF THE ART AND PROBLEM

There are numerous disclosures in the art as to the desirability of fueling an internal combustion engine (ICE) with hydrogen. Not the least among the advantages envisioned by the art is that a hydrogen fueled ICE should produce only water as an exhaust product rather than the water-carbon oxide exhaust products of engines fueled by hydrocarbons. The absence of carbon oxides especially carbon monoxide from exhaust gases is very important in instances where the ICE is employed in closed-off spaces such as in mines. Buildup of carbon monoxide in mine atmospheres is exceedingly dangerous and is the subject of mine safety regulation. Where ICE's fueled by hydrocarbons are employed in mines, it is mandatory that excess ventilation be provided so as to prevent exhaust fume buildup. Such excess ventilation is costly not only in capital equipment but also in operation and maintenance. In addition to usage in mines and other enclosed spaces, it is envisioned that hydrogen-fueled ICE's may find uses based upon the premise that hydrocarbon fuels are becoming scarce and more expensive. For example, it is contemplated that hydrogen can become an economically and environmentally acceptable fuel for urban busses and autos, fork-lift trucks and other vehicles used in circumstances where exhaust fumes are a problem.

Fueling an ICE with hydrogen presents problems. Substantial testing has revealed that hydrogen cannot be reliably introduced into an ICE by carburetion, that is by premixing air or other oxidizer and hydrogen and introducing the mixture into the combustion volume or volumes (e.g. cylinder or cylinders) of an ICE. Even if a carbureting device is employed to provide a properly stoichiometrically lean, hydrogen to air mixture, occasional instances of prefiring in the carburetor occur. Prior known fuel injection systems proposed for hydrogen fueling of ICE's are sometimes of complicated and expensive design and/or rely upon precise, difficultly maintainable valve settings to deliver controllable amounts of hydrogen to combustion volumes so as to provide adequate operator control of the ICE. Some prior systems, in effect, require an operator with an "educated foot", i.e. skill beyond that of an ordinary person, to produce satisfactory engine operation.

Some of the factors which must be considered in fueling an ICE with hydrogen are low volume energy density of the gas at low pressures; the fact that a hydrogen fueled ICE must be run lean, for example between about 20% and 70% stoichiometric with respect to hydrogen (i.e., between about 0.2 and 0.7 fuel/air equivalence ratio) so as to avoid excess nitrogen oxide ($NO_x$) emissions and abnormal combustion and; the fuel source should be at a pressure which does not present a serious hazard in case of accident. These and other factors and difficulties must be considered in any proposal for fueling an ICE with hydrogen.

BRIEF DESCRIPTION OF THE DRAWINGS

The objects and advantages of the present invention will become apparent from the following description taken in conjunction with the drawing in which.

GENERAL OBJECT AND DESCRIPTION OF THE INVENTION

It is an object of the present invention to provide a means of hydrogen gas injection into an ICE which means will be inexpensive and effective.

This object of the invention is attained through a fuel injection system for an ICE coupleable to a source of gaseous hydrogen comprising a means for controlling pressure, a means to selectively vary pressure control means, a chamber into which fuel gas, e.g. hydrogen gas of controlled pressure can flow from said means for controlling pressure, means for permitting gas flow between said means for controlling pressure and said chamber and said chamber and a combustion volume of the ICE, and means, for example, valve means, timed to said ICE, whereby during a fuel admission event of the combustion volume of the engine, flow of fuel gas from the chamber to a combustion volume of the engine is permitted and flow from said means for controlling pressure to said chamber is prohibited and whereby in the absence of a fuel intake event of the combustion volume of the engine, flow of hydrogen is permitted from said means for controlling pressure to said chamber and prohibited from said chamber to said combustion volume of the ICE.

Figure 1:
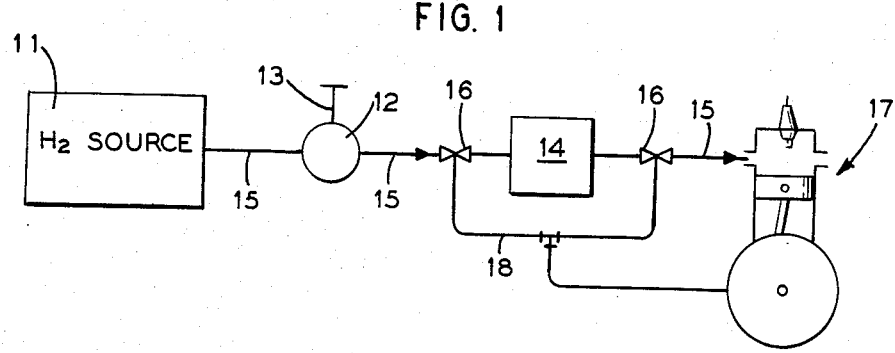
FIG. 1 is a diagramatical sketch of the elements of the invention as associated with a fuel supply means and an ICE.

For purposes of generalized description, the elements of and associated with the invention are illustrated in FIG. 1 of the drawing. Referring now thereto, these elements include a gaseous hydrogen source 11, a variable pressure regulator 12, means 13 to control variable pressure regulator 12, a chamber 14, conduits 15 and valves 16 timed to the ICE 17. For purposes of the invention, the gaseous hydrogen source 11 is advantageously a tank wherein hydrogen is combined with a metallic hydride former from which it can be released at a known pressure by the application of heat to the hydrided metal material. The release pressure is governed by both the nature of the hydride former and the temperature to which the hydrided material is heated. For example, if one wishes to deliver hydrogen at 3 atmospheres absolute employing heat derived from an ambient atmosphere at a temperature of about 25° C., one can employ as a metallic hydride former $(Fe_{0.9}Mn_{0.1})Ti$. Alternatively if one wishes to deliver hydrogen at 3 atmospheres absolute, using exhaust heat from the ICE to raise the temperature of hydrided material to about 300° C. then one can use $Mg_2Ni$ as part of the hydridable material in the fuel storage tank 11. Suitable hydride-forming alloys are sold under the designation HY-STOR by Ergenics Div. of MPD Corporation, Wykoff, N.J. and include FeTi, $(Fe_{0.9}Mn_{0.1})Ti$, $(Fe_{0.8}Ni_{0.2})Ti$, $CaNi_5$, $M^*Ni_5$, $LaNi_5$ $CFRM^{**}Ni_5$, $(Ca_{0.7}M_{0.3})Ti$, $(Ca_{0.2}M_{0.8})Ni_5$, $Mg_2Ni$ and $Mg_2Cu$. While the most advantageous embodiment of the present invention is conceived as a fuel injection system operating between an ICE and a hydride storage tank for hydrogen, the invention is not to be considered as so limited. If desired, one can employ tanks of hydrogen gas under pressure or tanks of liquified hydrogen as fuel sources 11 for mobile ICE's. In the case of stationary engines, the fuel source 11 can be any conduit of hydrogen carried at an appropriate pressure. Further, while the present invention is described in conjunction with hydrogen as a fuel and is deemed most advantageous with hydrogen as a fuel because of preignition firing in carburetor devices using hydrogen, the system of the present invention can be readily adapted for use with other fuel gases such as natural or synthetic fuel gases.
* M=mischmetal
** CFM=cerium-free mischmetal The pressure control means, e.g. pressure regulator 12 employed in the fuel injection system of the present invention can be of any adjustable type. This type of pressure regulator 12 is variable in that it enables delivery of any pressure of gas from zero atmosphere absolute up to the source pressure. It is a feature of the fuel injection system of the present invention that the means 13 for varying the pressure of gas delivered by the regulator is employed as the means for varying the amount of hydrogen gas delivered to ICE 17 during each fuel intake event and thus varying the power output of ICE 17. Normally, in a non-stationary ICE 17, means 13 for varying the output pressure of the regulator will be a mechanical, pneumatic, hydraulic or electrical linkage from an accelerator pedal of a vehicle, operable such that when the accelerator pedal is depressed, a greater pressure of hydrogen is applied by the regulator and, when the pedal is released, the pressure of hydrogen applied by the regulator is decreased. With stationary ICE's 17, it is usually more convenient to embody the means of varying the pressure of hydrogen applied by regulator 12 in the form of a throttle lever or in some automatic device which will vary the pressure delivered from regulator 12 by feed-back from a load or speed sensing means, the greater the load, the greater will be the pressure delivered by regulator 12 and vice versa. Similarly, automatic speed control may be accomplished by attaching the regulator to a speed sensing means or "governor".

Chamber 14 along with associated valves 16, valve control system 18 timed to ICE 17 and conduits 15 permit delivery of gaseous hydrogen fuel to ICE 17. For each combustion volume (cylinder) of ICE 17, there is provided either an individual chamber 14 or a complex of conduits 15 appropriately valved to admit hydrogen to ICE 17 only during a fuel intake event in each cylinder. In one embodiment of the invention wherein high pressure (i.e., greater than about 1.7 atmospheres absolute) hydrogen gas is delivered from regulator 12, chamber 14 constitutes a simple enclosure of precisely calibrated volume. The volume of chamber 14 is determined by the displacement volume of the cylinder or other combustion volume to which it is connected, the maximum fraction of stoichiometry at which the ICE will be run and the ratio of absolute pressures of fuel and oxidizer gases in the cylinder on intake and the maximum pressure of hydrogen which will be delivered by regulator 12. Assuming air at pressure P is used as the oxidizer. Pi is the pressure of hydrogen delivered by the regulator (and the maximum pressure in chamber 14), Pf is the final pressure in chamber 14 after hydrogen is delivered to combustion volume of ICE 17, v is the volume of chamber 14, V is the volume of the combustion volume and fH is the volume fraction of hydrogen desired in the combustion volume, then the volume of chamber 14 is defined by $$v = fH \times \frac{Pf\,V}{Pi - Pf}$$

For practical purposes fH should be in the range of about 0.07 to 0.30 and preferably in the range of about 0.07 to 0.20.

In its physical embodiment, chamber 14 can comprise a simple chamber of fixed volume machined of metal sufficiently thick to safely withstand the use pressures. Chamber 14 can also include an adjusting means, for example a movable piston, which will allow modification of the volume of the chamber to provide for variations in operating parameters in the operation of ICE 17. Excess volume in chamber 14 resulting from outward motion of the movable piston can be highly advantageous for cold starts, if source pressure is insufficient for normal operations.

In the ordinary case, the pressure of hydrogen downstream from regulator 12 is sufficient to force hydrogen into chamber 14 and from there into ICE 17 during a fuel intake event of ICE 17. However, in some instances where it is desirable to maintain a low source pressure of hydrogen, for example, when the pressure of hydrogen in source 11 is about one atmosphere absolute, chamber 14 can be the displacement volume of a positive displacement pump which is timed to ICE 17 to provide a force stroke to induce flow of hydrogen into ICE 17 during a fuel intake event of ICE 17. In the instance where a pump displacement volume is employed, valves 16 are usually integral with the pump. When a higher pressure source of hydrogen 11 is used or a pressure increasing pump and surge volume is placed between a low pressure hydrogen source 11 and regulator 12, valves 16 are opened and closed in conformance with fuel intake events of ICE 17. Advantageously, as disclosed hereinafter, valves 16 are ganged rotary valves actuated by a toothed belt, a chain or a gear drive operated from ICE 17.

ICE 17 as shown in FIG. 1 is intended to be generic to any type of internal combustion engine in which gaseous fuel can be oxidized using air or any other oxidizer and which does not require pre-mixing of fuel and air prior to entry into a cylinder or combustion volume. ICE 17 can employ any cycle including either the Otto or Diesel cycle, except that diesel cycle engines require an ignition means, since hydrogen does not ignite reliably by compression heating. ICE 17 can be water-cooled or air-cooled, may be of two stroke or four stroke design and can be of mechanically linked, e.g., crank-linked, swash-plate-linked, or free piston design. Usually the combustion volume of ICE 17 is a cylinder. However, the invention is also applicable to Wankel type engines and variants thereof. The fuel intake event in ICE 17 can be either after, before or during compression of the air (oxidizer)-fuel mixture depending on the cycle-type of the engine. Hydrogen gas exiting from or being forced from chamber 14 can be introduced into ICE 17 either at or near the point of air intake to the combustion volume or through a port in the wall of the combustion volume which port is advantageously provided with a check valve to isolate conduit 15 from the high pressure produced on ignition of the hydrogen gas-oxidizer mixture. Conduit 15 can be eliminated by placing chamber 14 directly adjacent the valved port to the combustion volume. If desired, ICE 17 can be provided with means such as swirl surfaces on the interior of the walls of the combustion volume to facilitate mixture of the hydrogen gas and oxidizer. Furthermore, conduit 15 can be branched to provide more than one entry port to a combustion volume so as, if desired, to provide a stratified richer or leaner hydrogen gas-oxidizer mixture in any desired locus of the combustion volume. Those skilled in the art will recognize that supplemental techniques such as water injection, exhaust recirculation, turbocharging after-cooling, etc. can be used with advantage in ICE 17 in association with the features of the present invention but are not required for operation in accordance with the present invention.

Figure 2:
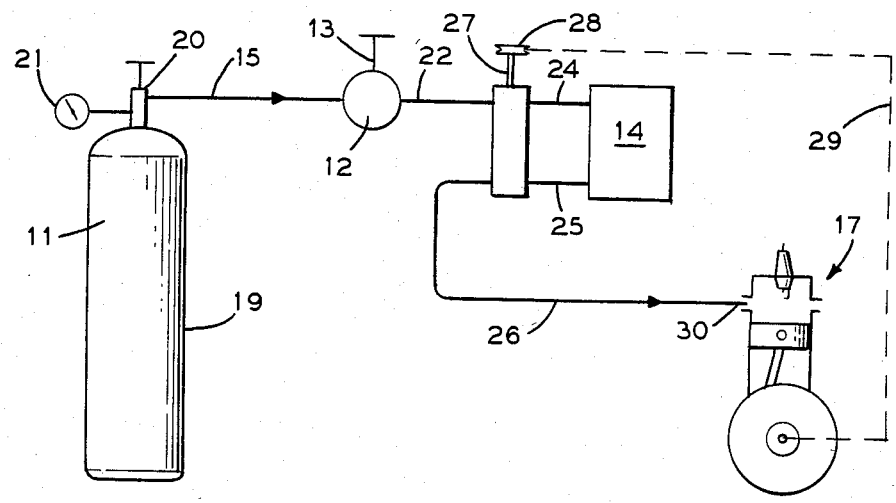
FIG. 2 depicts the system of the present invention as applied to a single cylinder, four stroke, Otto cycle ICE wherein hydrogen gas fuel is supplied from a high pressure source.

Referring now to FIG. 2, hydrogen source 11 is a high pressure container 19 having valve means 20, pressure indicator 21 and high pressure conduit 15. Connected to high pressure conduit 15 is regulator 12 having means 13 to control variable pressure regulator 12. Conduit 22 extends from pressure regulator 12 to rotary valve 23. Two conduits 24 and 25 extend between rotary valve 23 and chamber 14 and a further conduit 26 extends from rotary valve 23 to four-stroke ICE 17. Rotary valve 23 is a ganged valve means incorporating both valves 16 of FIG. 1 and includes a rotating shaft 27 having pulley 28 or other means on one end connected mechanically by means 29 (e.g timing belt, chain or the like) to the mechanical output of ICE 17. In operation, the system of FIG. 2 operates by causing hydrogen gas at high pressure to exit from container 19 through valve means 20 and conduit 15 and be selectively reduced in pressure by regulator 12. Rotary valve 23 is so configured and arranged that during any stroke of ICE 17, other than the intake stroke, hydrogen gas can flow through conduits 22 and 24 into chamber 14. During the intake stroke gas flow through conduit 22 is cut off and gas is permitted to flow through conduits 25 and 26 to the intake port 30 of ICE 17. Conduit 26 terminates at intake port 30 as close as practical to the seat of the intake valve. Because of the wide variety of intake valve designs, the exact arrangement of the terminus of conduit 26 to the valve is not illustrated. However, those skilled in the art will recognize from the description herein that it is an objective of the present invention to avoid, as much as practical, mixing of hydrogen and combustion air external to the combustion volume of ICE 17.

Figure 3:
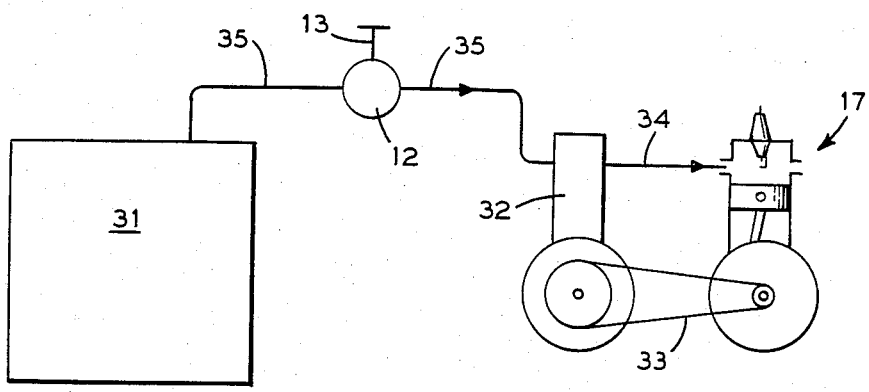
FIG. 3 depicts the system of the present invention as applied to a single cylinder, four stroke, Otto cycle ICE wherein hydrogen gas fuel is supplied from a low pressure source.

When employing a low pressure source of hydrogen 31 to fuel an ICE 17, the system as depicted in FIG. 3 can be used. In that system hydrogen flows from source to pressure regulator 12 variable by means 13 and then to positive displacement compressor 32. Compressor 32 is mechanically linked to ICE 17 as for example by belt drive 33 and so arranged that discharge from compressor 32 through conduit 34 occurs only on the intake stroke of ICE 17. Valves 16 of FIG. 1 and valve 23 of FIG. 2 have counterparts in FIG. 3 in the internal valves of compressor 32 which control intake from conduits 35 and discharge through conduit 34. In all respects other than the compressing of hydrogen gas by compressor 32, the system of FIG. 3 operates in the same manner as the system of FIG. 2.

Figure 4:
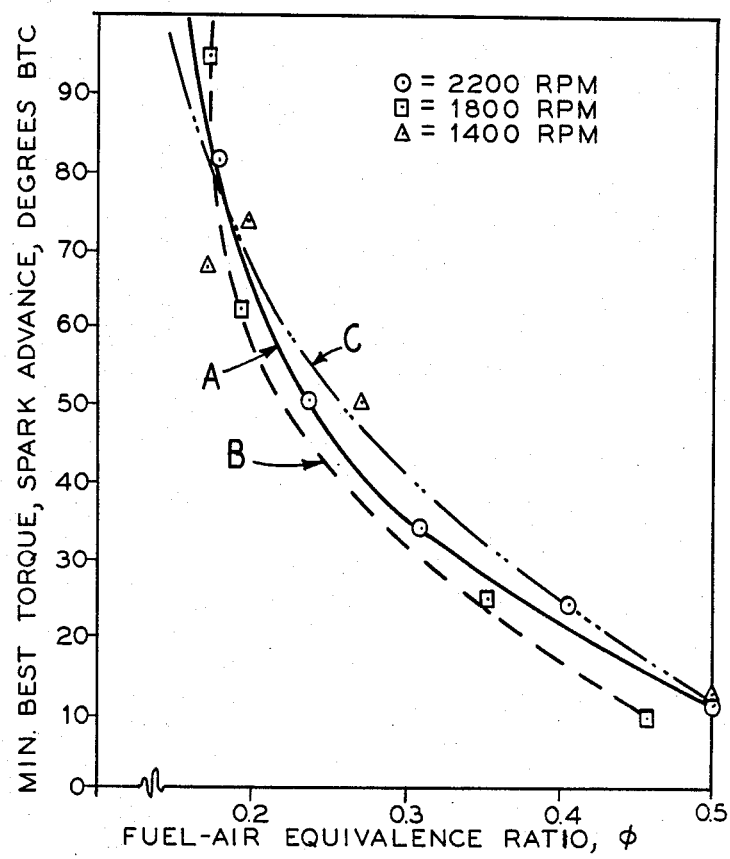
FIG. 4 is an illustrative graph showing the relationship of ignition timing and fuel/air equivalence ratio for an Otto cycle engine operating under certain, specified conditions.

FIG. 4 shows the variation of ignition timing required to achieve efficient low $NO_x$ combustion and optimum torque over a range of fuel/air equivalence ratios. The data from which FIG. 4 was compiled was obtained on a Caterpillar 3304N engine operating on hydrogen fuel with a wide open throttle with a compression ratio of 10.5 to 1 under the conditions of 83.3 KPa atmospheric pressure and an inlet air temperature of $24° \pm 3°$ C. Any engine control system should be capable of matching the spark timing to the mixture being supplied to the engine since, as demonstrated by FIG. 4, there is a large variation in the correct/timing as the mixture changes. The present invention uses pressure to control mixture and can also use pressure to control spark timing by a simple diaphragm similar to a vacuum advance on conventional gasoline engine ignition systems. With respect to the graph of FIG. 4, three curves are given; curve A, curve B and curve C. Curve A represents the best fit for the data obtained. For purposes of the present invention, it is deemed that operation as to fuel/air equivalence ratio anywhere between the limits defined by curves B and C at any given spark advance and operation at any spark advance between the limits defined by curves B and C for any given fuel/air equivalence ratio will give satisfactory engine operation.

Figure 5:
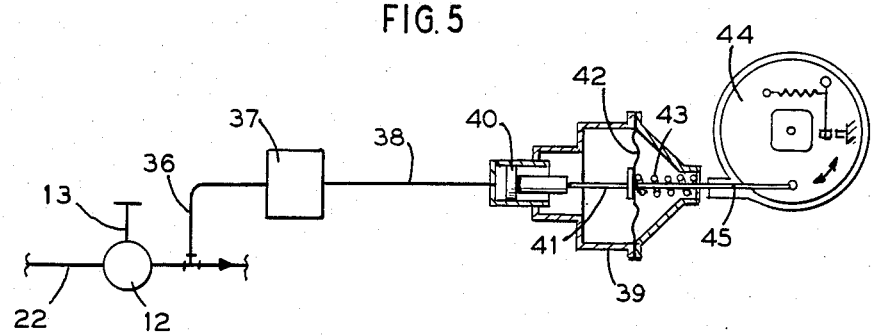
FIG. 5 illustrates a spark timing adjusting means useful in the practice of the present invention.

A device, as shown in FIG. 5, causes the spark timing to be retarded as pressure increases thus approximating the curve in the FIG. 4. Referring now to FIG. 5, this figure shows conduit 36 branching off from conduit 22 as depicted in FIG. 2 (conduit 15 low pressure side in FIG. 1 or conduit 35 lower pressure side of FIG. 3) connecting with surge tank 37. Conduit 38 extends from surge tank 37 to pressure side of diaphragm housing 39. Inside housing 39 is positioned piston 40. As depicted motion of piston 40 is transmitted to diaphragm 42 by rod 41. Alternatively, pressure changes from conduit 38 can act directly on diaphragm 42 with piston 40 and rod 41 being eliminated. The motion of diaphragm 42, opposed by spring 43, is transmitted to contact breaker plate 44 of a conventional distributor by rod 45. Rod 45 is attached to contact breaker plate 44 so that motion to the right of rod 45 will decrease the spark advance. In this manner, it is possible to operate an Otto cycle ICE essentially within the limits indicated by curves B and C of FIG. 4. Those skilled in the art will appreciate that the function of the apparatus of FIG. 5 can also be accomplished by mechanical linkage to means 13 controlling pressure regulator 12 and also by electromechanical, electronic-mechanical or purely electronic means activated by a pressure transducer positioned anywhere between pressure regulator 12 and the intake port of ICE 17.

Figure 6:
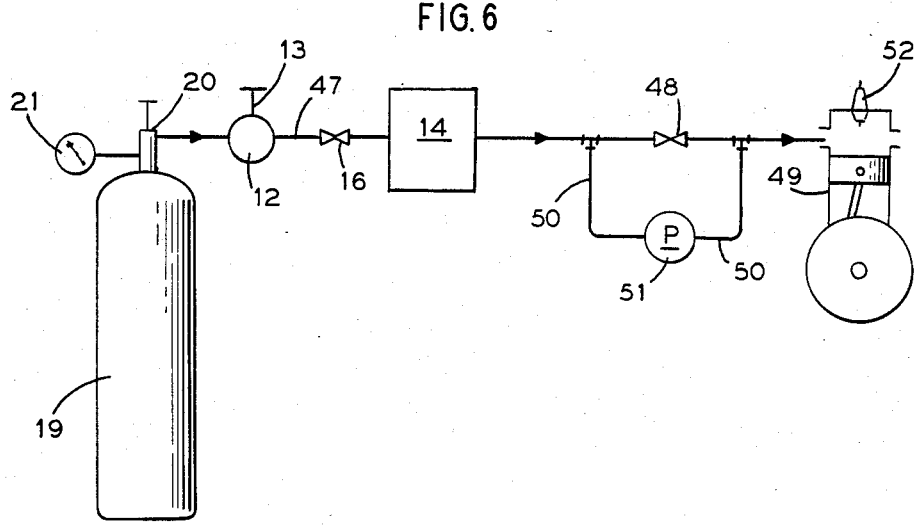
FIG. 6 depicts the system of the present invention as applied to a single cylinder two stroke, Diesel cycle engine.

While the present invention is particularly applicable to Otto cycle internal combustion engines, it can be adapted to Diesel engines. Such an adaption is depicted in FIG. 6. Referring now thereto hydrogen is stored in high pressure container 19 fitted with valve means 20 and pressure indicator 21. As in other embodiments hydrogen exiting from container 19 passes through line 46 to pressure regulator 12 having means 13 to control pressure regulator 12. Hydrogen gas at some lower pressure exits from pressure regulator 12 through conduit into chamber 14 when valve 16 is open. During a fuel intake event of diesel ICE 49 valve 16 is closed and valve 48 between chamber 14 and diesel ICE 49 is open. Valve 48 can be a modified, enlarged fuel injection valve on diesel ICE 49. Assuming that diesel ICE 49 operates at a 25 to 1 compression ratio, peak pressures in a naturally aspirated engine prior to fuel injection will be of the order of 4000 KPa. In order for hydrogen to be injected into the combustion volume of diesel ICE 49 the pressure in chamber 14 either exceeds 4000 KPa by a substantial margin or a pressure increasing device such as pump 51 must be included in alternate hydrogen feed line 50. As those skilled in the art will recognize, hydrogen injected into diesel ICE 49 can be injected directly into a cylinder or into precombustion chamber or a swirl chamber. For reliable operation, it is necessary to modify diesel ICE 49 by inclusion therein of an ignition device 52 because, as stated hereinbefore hydrogen-air mixtures do not reliably ignite solely under compression condition.

In this specification, it has been disclosed that pressure control of hydrogen exiting from a hydrogen source is by means of a pressure regulator. Those skilled in the art will appreciate that such pressure regulation can also be accomplished by employing any sort of adjustable valve such as a butterfly valve, a plug valve, a variable orifice valve and the like.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A fuel injection system for an internal combustion engine coupleable to a source of gaseous hydrogen comprising a means for controlling pressure, a means to selectively vary said pressure control means, a chamber into which hydrogen gas of regulated pressure can flow from said pressure control means, conduit means between said pressure control means and said chamber and a combustion volume of said internal combustion engine and means, timed to said internal combustion engine, whereby during a fuel intake event of said combustion volume of said engine flow of hydrogen from said chamber to a combustion volume of said engine is permitted and from said pressure control means to said chamber is prohibited and whereby the absence of a fuel intake event of said combustion volume of said engine, flow of hydrogen is permitted from said pressure control means to said chamber and prohibited from said chamber to said combustion volume of said internal combustion engine.

2. A fuel injection system as in claim 1 wherein said means for controlling pressure is a regulator.

3. A fuel injection system as in claim 1 wherein said means for controlling pressure is a variable valve.

4. A fuel injection system as in claim 1 coupleable to a hydride hydrogen storage means.

5. A fuel injection system as in claim 1 wherein said chamber includes means for varying the volume thereof.

6. A fuel injection system as in claim 5 wherein said means for varying the volume of said chamber comprises a piston.

7. A fuel injection system as in claim 1 wherein the internal combustion engine is an Otto cycle engine.

8. A fuel injection system as in claim 7 which includes a pressure sensing means in said system downstream from said means for controlling pressure coupled to a means for controlling the spark timing of said Otto cycle engine to thereby advance said timing when pressure is low and retard said timing when pressure is high.

9. A fuel injection system as in claim 7 so constructed and arranged that its fuel-air equivalence ratio in a combustion volume of said Otto cycle engine is less than about 0.7.

10. A fuel injection system as in claim 9 wherein the fuel-air volume ratio is in the range of about 0.07 to about 0.30.

11. A fuel injection system as in claim 7 wherein said Otto cycle engine is of a piston-cylinder design.

12. A fuel injection system as in claim 11 wherein conduit means between said chamber and the cylinder of said Otto cycle engine terminates in an air feed line as close to an air intake valve as is practical.

13. A fuel injection system as in claim 12 wherein said conduit means between said chamber and said cylinder comprises essentially a valved port on said chamber opening onto the air feed line of said Otto cycle engine.

14. A fuel injection system as in claim 1 coupleable to a source of low pressure hydrogen wherein said chamber comprises the displacement volume of a positive displacement-type compressor.

15. A fuel injection system as in claim 1 wherein said means, timed to said internal combustion engine comprises ganged rotary valves mechanically linked to a mechanical output of said internal combustion engine.

16. A fuel injection system as in claim 1 wherein said means, timed to said internal combustion engine comprises valves of a positive displacement-type compressor driven by mechanical linkage from the mechanical output of said internal combustion engine.

17. A fuel injection system as in claim 2 wherein said means to selectively vary said regulator comprises a linkage to a pedal speed control.

18. A fuel injection system as in claim 2 wherein said means to selectively vary said regulator comprise feedback means responsive to load or speed sensing of said internal combustion engine.

19. A fuel injection system as in claim 17 wherein said linkage to a pedal speed control is a mechanical linkage.

20. A fuel injection system as in claim 1 wherein said internal combustion engine is a modified diesel cycle engine fitted with an ignition device.

21. A fuel injection system as in claim 20 coupleable to a source of hydrogen at a pressure significantly greater than the internal pressure of air in said combustion volume of said diesel cycle engine prior to fuel injection.

22. A fuel injection system as in claim 20 which includes compressor means to raise the pressure of hydrogen to injection pressure.

* * * * *